United States Patent
Ecker et al.

(10) Patent No.: US 8,798,205 B2
(45) Date of Patent: Aug. 5, 2014

(54) TELEMETRY POLLING CIRCUIT WITH NOISE DISCRIMINATION AND SELECTABLE TUNING

(71) Applicant: Medtronic, Inc., Minneapolis, MN (US)

(72) Inventors: Robert M. Ecker, Lino Lakes, MN (US); James D. Reinke, Maple Grove, MN (US); John R. Ukura, Lino Lakes, MN (US)

(73) Assignee: Medtronic, Inc., Minneapolis, MN (US)

( * ) Notice: Subject to any disclaimer, the term of this patent is extended or adjusted under 35 U.S.C. 154(b) by 11 days.

(21) Appl. No.: 13/656,837

(22) Filed: Oct. 22, 2012

(65) Prior Publication Data

US 2014/0112408 A1    Apr. 24, 2014

(51) Int. Cl.
*H03K 9/00*    (2006.01)

(52) U.S. Cl.
USPC ........... 375/316; 375/271; 375/354; 375/356; 607/60; 607/32; 607/30; 607/31; 607/59; 455/227

(58) Field of Classification Search
USPC ........ 375/271, 316, 354, 356; 607/60, 32, 30, 607/31, 59; 455/227
See application file for complete search history.

(56) References Cited

U.S. PATENT DOCUMENTS

| | | | |
|---|---|---|---|
| 6,788,973 B2* | 9/2004 | Davis et al. | 607/32 |
| 7,664,553 B2 | 2/2010 | Roberts | |
| 7,890,181 B2* | 2/2011 | Denzene et al. | 607/60 |
| 8,059,628 B2 | 11/2011 | Bradley et al. | |
| 8,108,044 B2 | 1/2012 | Le Reverend et al. | |
| 8,185,210 B2* | 5/2012 | Haubrich et al. | 607/60 |
| 2003/0114898 A1 | 6/2003 | Von Arx | |
| 2007/0123946 A1 | 5/2007 | Masoud | |
| 2008/0114412 A1 | 5/2008 | Bange | |
| 2009/0275293 A1 | 11/2009 | Ida | |
| 2009/0291656 A1* | 11/2009 | Le Reverend et al. | 455/227 |
| 2010/0023085 A1* | 1/2010 | Wu et al. | 607/30 |
| 2010/0036461 A1 | 2/2010 | Ramakrishnan | |
| 2010/0189198 A1* | 7/2010 | Eskin | 375/340 |
| 2011/0313491 A1 | 12/2011 | Bange | |

* cited by examiner

*Primary Examiner* — Siu Lee
(74) *Attorney, Agent, or Firm* — Michael J. Ostrom; Stephen W. Bauer

(57) ABSTRACT

A medical device communication system includes a receiver adapted to receive radio frequency (RF) signals and configured to operate in a first mode to poll for an RF signal for a first time interval to detect an element of a valid input signal during the first time interval. In response to detecting the element of a valid input signal in the first time interval, the receiver operates in a second mode to poll for the RF signal for a second time interval to analyze the RF signal over the second time interval to detect a valid modulation of the RF signal. In response to detecting a valid modulation of the RF signal during the second time interval, the receiver is enabled to establish a communication session with a transmitting device.

18 Claims, 11 Drawing Sheets

200

| State(s) | Frequency Count at end of counting period | Frequency count at half counting period | OOB/FS indicator | Select Carrier Nominal | Select Carrier Skewed Low | Select Carrier Skewed High |
|---|---|---|---|---|---|---|
| 0 | 0 | 0 | | | | |
| 1-7 | 6250 - 43750 | 12500 - 87500 | FS + Noise | | | |
| 8-20 | 50000 - 125000 | | Noise | | | |
| 21 | 131250 | 262500 | FS | FL | FL | FL |
| 22 | 137500 | 275000 | FS | FL | FL | FL |
| 23 | 143750 | 287500 | FS | FL | FL | FL |
| 24 | 150000 | 300000 | FS | FL | FL | FL |
| 25 | 156250 | 312500 | FS | FL | FL | FL |
| 26 | 162500 | 325000 | FS | FL | FL | FL |
| 27 | 168750 | 337500 | FS | FL | CARR | FL |
| 28 | 175000 | 350000 | FS | CARR | FH | FL |
| 29 | 181250 | 362500 | FS | FH | FH | CARR |
| 30 | 187500 | 375000 | FS | FH | FH | FH |
| 31 | 193750 | 387500 | FS | FH | FH | FH |
| 32 | 200000 | 400000 | FS | FH | FH | FH |
| 33 | 206250 | 412500 | FS | FH | FH | FH |
| 34 | 212500 | 425000 | FS | FH | FH | FH |
| 35 | 218750 | 437500 | FS | FH | FH | FH |
| 36-39 | 225000 - 243750 | | Noise | | | |

FIG. 5

TELEMETRY POLLING CIRCUIT WITH NOISE DISCRIMINATION AND SELECTABLE TUNING

FIELD OF THE DISCLOSURE

The disclosure relates generally to wireless telemetry systems for medical devices and, in particular, to a telemetry system and associated method for discriminating between transmitted downlink signals and noise.

BACKGROUND

In recent years, implantable medical device (IMD) technology has rapidly advanced. Sizes and weights of these devices have decreased, while functionality has increased. These advances have created a corresponding demand for improved two-way communication, or wireless telemetry, between the IMD and an external programming device, such as an IMD programmer. Current wireless telemetry systems are designed to provide two-way telemetry by radio frequency (RF) signal transmission between an antenna coil located within the IMD and an antenna coil located in a programming head of the IMD programmer. The programming head can be positioned over the patient's IMD implant site for wireless programming or interrogation of the implanted device. Command instructions or data that are downloaded to the IMD are referred to as downlink transmissions, and data transmitted from the IMD to the IMD programmer device are referred to as uplink transmissions.

The IMD programmer device typically communicates with the IMD using a designated carrier frequency. This RF carrier signal is modulated with transmitted data using modulation or encoding schemes that include, but are not limited to, pulse position modulation (PPM), frequency shift keying (FSK), differential binary phase shift keying (DBPSK) and burst counting (active and inactive states). A polling circuit in a receiver of the IMD programmer typically polls for a downlink transmission signal on a periodic basis. If an antenna of the IMD resonates above a threshold frequency, for example, the receiver in the IMD programmer will be powered up to enable the IMD to communicate with the IMD programmer in a wireless telemetry session. This process of enabling the receiver of the IMD for a telemetry session is often referred to as a "wake-up". However, not all signals received by the IMD antenna are true downlink transmissions. Electromagnetic noise, out-of-band RF signals, and other interference may be received by the antenna of the IMD and cause false "wake-ups" of the receiver of IMD, unnecessarily drawing current from the IMD battery. After attempting to process an incoming signal, the IMD may determine that the data is a false signal and power down the receiver, i.e. put the telemetry processing and receiving circuitry in a low power or sleep mode.

Preserving battery life is a primary consideration in the design of new implantable medical devices. Reducing the number of times that the receiver of the IMD "wakes up" from a power saving sleep mode to a full-powered telemetry session mode prevents current drain of the battery. Accordingly, there remains a need for a medical device communication system and associated method for operating a medical device RF receiver for discriminating between true downlink RF signals and noise as well as providing other related power and space savings solutions.

SUMMARY

According to various embodiments, a medical device receiver adapted to receive radio frequency (RF) signals includes a control unit that is configured to operate the receiver in a first mode to poll for an RF signal for a first time interval and analyze the RF signal to detect an element of a valid input signal during the first time interval. In response to detecting the element of a valid input signal in the first time interval, the receiver operates in a second mode to poll for the RF signal for a second time interval to analyze the RF signal over the second time interval to detect a valid modulation of the RF signal. In some embodiments, the second time interval is longer than the first time interval. In response to detecting a valid modulation of the RF signal during the second time interval, the receiver is enabled to establish a communication session with a transmitting device. Enabling the receiver for a communication session includes powering a telemetry central processing unit.

In one example, the receiver is operated to detect the valid modulation over the second time interval. In response to a received RF signal meeting a frequency requirement in the first time interval, the receiver is operated in a second mode to poll for the RF signal for a second time interval and analyze frequency transitions of the RF signal over the second time interval. In some examples, the second time window is longer than the first time interval. In response to the RF signal meeting a detection threshold number of frequency transitions over the second time interval, the receiver is enabled to establish a communication session with a transmitting device which includes fully powering up a telemetry central processing unit (CPU).

In one example, detecting the element of the valid input signal during the first time interval includes detecting a frequency component of a predefined frequency modulated signal. Detecting the valid modulation of the RF signal during the second interval comprises detecting a predefined frequency modulation of the signal. The receiver may also operate to determine if a carrier signal is present during the first time interval. If the carrier signal is detected, the receiver may remain operating in the first mode for the entire duration of the first time interval or an extended first time interval, waiting to detect an element of a valid input signal.

In one example, the receiver operates in a second mode during the second time period by counting frequency transitions between two or more frequencies defining a valid frequency modulation pattern and either issuing a telemetry interrupt signal in response to detecting a threshold number of frequency transitions, and thus detecting a valid modulation pattern, or issuing a polling done signal if a required number of frequency transitions is not detected. In some embodiments, the receiver compares counts of frequency transitions obtained during the second time interval for each of a plurality of frequency decoding modes and selects a decoding mode that digitally tunes the receiver to the transmitting antenna carrier frequency.

In another embodiment, a method for operating a medical device receiver includes operating the receiver in a first mode to poll for an RF signal for a first time interval, analyzing the RF signal to detect an element of a valid input signal during the first time interval, and in response to detecting the element of a valid input signal in the first time interval, operating the receiver in a second mode to poll for the RF signal for a second time interval. During the second time interval, the RF signal is analyzed detect a valid modulation of the RF signal. In response to detecting the valid modulation, the receiver is enabled to establish a communication session with a transmitting device including powering a telemetry central processing unit.

This summary is intended to provide an overview of the subject matter described in this disclosure. It is not intended to provide an exclusive or exhaustive explanation of the techniques as described in detail within the accompanying drawings and description below. Further details of one or more examples are set forth in the accompanying drawings and the description below. Other features, objects, and advantages will be apparent from the description and drawings, and from the statements provided below.

BRIEF DESCRIPTION OF THE DRAWINGS

FIG. 5 is an example table of decoded counter values used by a frequency decoder in the receiver shown in FIG. 4 according to one embodiment.

DETAILED DESCRIPTION

In the following description, references are made to illustrative embodiments. It is understood that other embodiments may be utilized without departing from the scope of the disclosure. The present disclosure is generally directed to a medical device communication system and associated method that includes a receiver circuit that enables a medical device to distinguish between an RF frequency signal that is transmitted by another medical device and noise. Improved RF frequency discrimination prolongs battery life of the medical device because noise will not be unnecessarily processed as valid signals by the medical device.

The receiver circuit and its operation as disclosed herein are particularly useful in IMDs adapted for receiving downlink telemetry signals from an external programmer because of the power and space savings of the disclosed techniques. However, the disclosed receiver and operation techniques are not necessarily limited to such an application. For example, external medical devices such as wearable devices may not have the same size limitations as implantable devices, but power conservation may still be a goal to allow a patient to be ambulatory without frequent battery changes or charges. Accordingly, the RF communication system and methods of operation disclosed herein may be usefully implemented in any medical device system in which wireless communication between two devices is desired.

Figure 1:
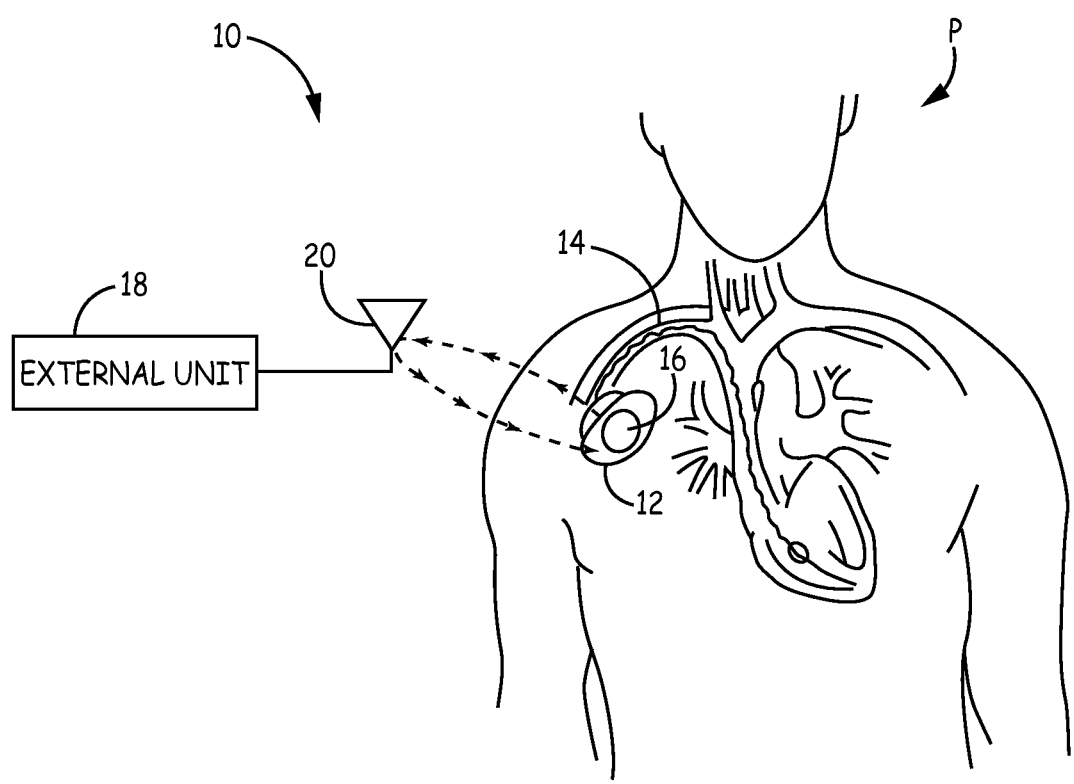
FIG. 1 is a schematic diagram illustrating a communication system that enables communication between an IMD and an external unit.

FIG. 1 is a schematic diagram illustrating a communication system 10 that enables communication between an IMD 12 and an external unit 18. In one embodiment, IMD 12 is an implantable cardiac electrical stimulation device such as a cardiac pacemaker or implantable cardioverter defibrillator (ICD), but the disclosed communication system is equally applicable to many types of implantable medical devices, including implantable monitors, drug delivery devices, neurostimulation devices and more, and may even be applicable to wholly external medical device systems, e.g. which may include a wearable or bedside monitoring device, as mentioned previously. In the example shown in FIG. 1, IMD 12 is capable of providing cardiac electrical stimulation therapies and/or sensing physiological events of the heart of patient P via cardiac lead(s) 14. In some embodiments, IMD 14 may be a leadless device, which includes sensors and/or electrodes incorporated inside or along the housing of the IMD.

Antenna 16 is used to communicate with external unit 18 and may be any device capable of sending or receiving electromagnetic energy, including, for example, a surface mounted antenna, an inductor, or a half-wave strip. Antenna 16 may be incorporated in or along an IMD housing or lead connector block in various embodiments.

External unit 18 is a device, such as a medical device programmer, capable of communication with IMD 12 via external antenna 20. External unit 18 includes antenna 20, which may be any type of one or more RF antenna(e) capable of communicating in the desired RF frequencies with IMD 12, and may be located inside or outside of a housing of external unit 18. In one example, antenna 20 may be included in a RF programming head adapted for positioning over IMD 12 to enable transmission of RF signals between antenna 20 and antenna 16. In other embodiments, antenna 20 may be located in or along a housing of external unit 18 transmitting to and receiving from antenna 16 without requiring a user to position a programming head over IMD 12.

External unit 18 may be embodied as a programmer used in a clinic or hospital, for example, for programming operational parameters and/or operating programs in IMD 12 during a telemetry session for controlling IMD function and for interrogating IMD 12 for retrieving data accumulated by IMD 12. For example, upon an interrogation command transmitted from external unit 18 to IMD 12, operational device-related data, therapy delivery data, and/or physiological signal data acquired by IMD 12 may be transmitted from IMD 12 to external unit 18. In alternative embodiments, external unit 18 may be a handheld device, a home monitor, a computer or any other device adapted for wireless telemetric communication with IMD 10 and used by a patient, clinician or other caregiver.

Figure 2:
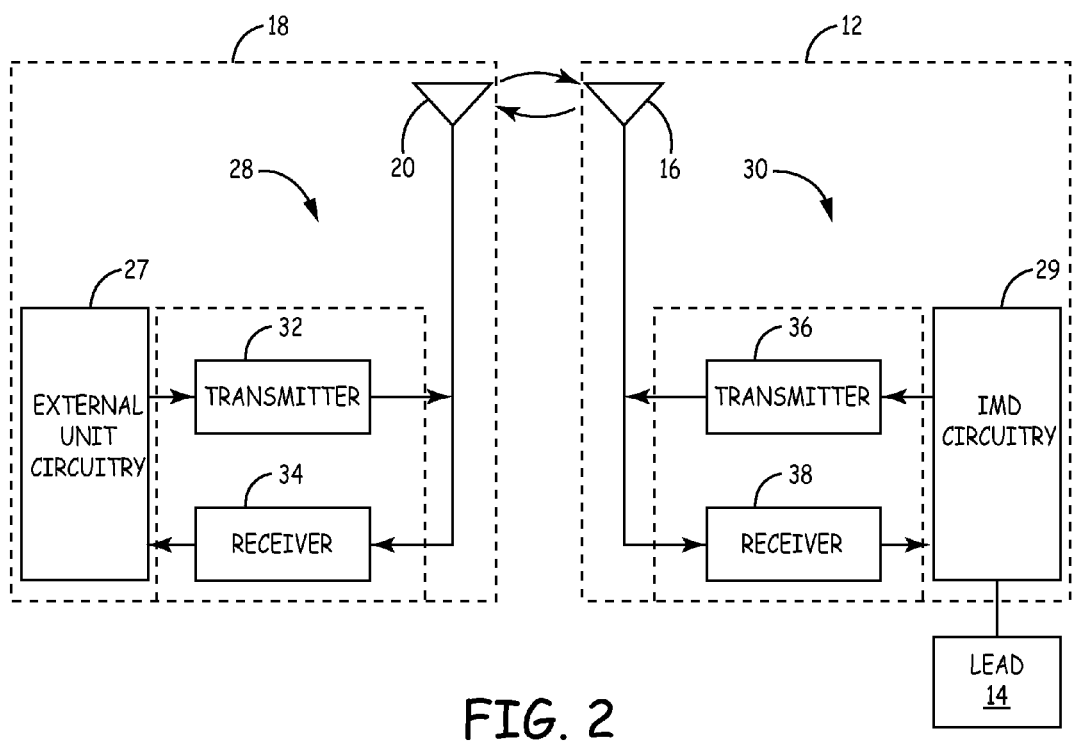
FIG. 2 is a block diagram illustrating some of the components of the IMD and external unit that make up the communication system shown in FIG. 1.

FIG. 2 is a block diagram illustrating some of the components of IMD 12 and external unit 18 that make up communication system 10. External unit 18 includes antenna 20, external unit circuitry 27, and transceiver 28. Antenna 20 is coupled to transceiver 28 of external unit 18. External unit circuitry 27 includes a microcomputer and software to control the operation of external unit 18. Transceiver 28 enables external unit circuitry 27 to transmit and receive communications with IMD 12. Transceiver 28 of external unit 18 includes transmitter 32 and/or receiver 34. External unit 18 generally includes other useful features not shown in FIG. 2 such as a display screen, user interface, printer, and a data port. One example of an IMD programmer which may be embodied as external unit 18 and adapted for use in the disclosed communication system is generally described in U.S. Pat. No. 6,788,973 (Davis, et al.), hereby incorporated herein by reference in its entirety.

IMD circuitry 29 includes a microprocessor for controlling the operation of IMD 12 and for processing data, therapy delivery circuitry for delivering a therapy through lead 14, and sensors for generating data, including data generated by detecting electrical signals on lead 14. Transceiver 30, coupled to antenna 16, enables IMD circuitry 29 to transmit and receive communications with external unit 18. Transceiver 30 includes transmitter 36 and receiver 38, which transmit and receive data using RF signals.

Because IMD 12 has a finite battery capacity or charge storage, one consideration in the design of RF communication system 10 is the energy efficiency of IMD 12. One factor in the energy efficiency of IMD 12 is the time transceiver 30 is enabled for receiving and processing signals received on antenna 16. Thus, an improvement in energy efficiency of transceiver 30 will lead to increased battery life of IMD 12. Reducing the energy consumption of transceiver 30 is particularly beneficial. Energy efficiency is less of an issue in the design of external unit 18, because external unit 18 may not be restricted to the same size limitations and can therefore dedicate a larger volume for battery(ies) or could be connected to an external power source such as a 120V AC. It is contemplated, however, that a power efficient receiver and some of the associated receiver operating techniques described herein for implementation in IMD receiver 38 may also be implemented in an external receiver 38 in medical device communication system 10.

While transmitters only need to be turned on when there is data to transmit, receivers are turned on much more frequently. No communication can take place unless the receiver is on, at least momentarily, to detect an attempted transmission from a transmitter. To provide a fast response time, a receiver may be turned on to "listen" for a wake-up signal from a transmitter as often as once every second or more. The response of the receiver to a detected signal will increase power consumption further. A false wake-up signal that is detected and causes the receiver to be enabled in a full-power mode and begin to analyze the received signals by a processing unit causes battery power to be consumed unnecessarily. Therefore, an increase in the energy efficiency of a receiver can provide a significant increase in the effective life of the power supply of the medical device.

Returning to communication system 10 of FIG. 2, transmitter 32 transmits a wake-up signal prior to the transmission of programming data or commands. The wake-up signal may, in some instances, be an Extended Downlink Synchronization Character (EDSC). The wake-up signal is transmitted by antenna 20 and includes a pre-defined characteristic modulation of a carrier signal that is recognizable by receiver 38 as a valid wake-up input signal. The wake-up signal is a modulated RF signal that includes at least two different elements differing from a characteristic of the carrier signal that are alternated in a predefined pattern. For example, in a frequency modulated wake-up signal, the predefined modulation pattern may include predefined intervals or numbers of cycles of two or more frequencies different than a carrier frequency. An example of a frequency modulated wake-up signal is provided herein for describing the polling process and wake-up techniques implemented in an RF receiver. The disclosed techniques, however, may be implemented in conjunction with numerous signal modulation methods and adapted for use with a wake-up signal defined using modulation methods other than frequency modulation.

In one embodiment, a wake-up signal is a frequency shift keyed (FSK) signal that repeatedly shifts the resonating frequency of transmitting antenna 20 between a low frequency for a first time interval and a high frequency for a next time interval within a selected frequency band and then repeats the low to high frequency pattern for a specified number of cycles. In one illustrative example, the wake-up signal may be defined as a 255 ms stream of FSK data shifting between a high frequency (FH) of 200 kHz and a low frequency (FL) of 150 kHz with each FH interval lasting 16 cycles (approximately 80 μs) and each FL interval lasting 12 cycles (approximately 80 μs). The transmitter 32 generates the wake-up signal downlink signal transmitted by antenna 20 in response to a user interacting with external unit 18 to initiate a telemetry session with IMD manually or automatically. For example external device 18 may transmit the wake-up signal downlink signal at scheduled times for collecting data from IMD 12.

Receiver 38 is controlled to periodically transition from an "off" or "sleep" state to a low power detection mode upon expiration of a programmed or pre-determined nominal polling interval to detect the wake-up signal. In order to provide a fast response to an attempt to communicate by external device 18, the receiver 38 may enter a low power detection mode at least once per second. In one embodiment, a nominal polling interval is 250 ms such that every 250 ms a polling period is started. During a first time period referred to herein as the detection phase of the polling period, the receiver 38 is enabled to "listen" for valid downlink signal content, e.g. frequency content in a valid communication band, in a low power operating mode. The low power operating mode of the receiver is considered low power at least in part because a central processing unit utilized for higher power input signal analysis is not yet powered up.

In one embodiment, at least one element or characteristic of a predefined valid modulation pattern must be detected during the first time interval in order for the receiver to transition to a second signal analysis phase of the polling period for detecting the actual modulation pattern of a valid input signal. In detecting at least one element or characteristic of the modulation pattern, modulation or transition from one signal characteristic or element to another, e.g. from one frequency to another is not required. For example, merely detecting a frequency, e.g., FL or FH, included in the wake-up signal definition is detecting an element of a valid input signal. Transition from FL to FH or FH to FL need not yet be detected. In other modulation techniques, detecting an element of a valid input signal during a first time interval may include detecting an amplitude, a phase, a pulse position, a burst or other aspect of the input signal that differs from a base or carrier signal and is included as a level or value of a signal characteristic that is being modulated to define a wake-up signal.

If no valid signal content is detected during the detection phase, receiver 38 is powered down to a "sleep" state in which transceiver 30 uses minimal power and is not enabled to receive downlink signals until the next polling interval expires when the receiver transitions again into the low power detection mode. As will be described herein, in response to no valid input signal data, e.g., no signal or an out-of-band (OOB) signal, receiver 38 will return to a sleep mode with no further data analysis. The detection phase is immediately terminated prior to expiration of a predetermined detection phase time interval in response to an OOB signal in some embodiments.

If the receiver 38 does not detect an element of a valid wake-up signal but does detect in-band signal data that corresponds to a carrier signal, such as a frequency within a specified range of a carrier frequency, the receiver 38 may remain in the low power operating mode for the entire detection phase, which is a predetermined time interval or number of clock cycles. In one embodiment, the detection phase is approximately 150 to 200 μs. The detection phase can be less than the duration of a wake-up signal because the receiver 38 is looking for evidence of a valid in-band signal during the detection phase that warrants further input signal data analysis to verify the wake-up signal. If no evidence of a valid wake-up signal is detected, further signal analysis is not performed, avoiding unnecessary power consumption by receiver 38. In one embodiment, when a carrier frequency is detected during the detection phase, the receiver 38 responds to this in-band signal by remaining in the low power listening mode of the first detection phase to wait for possible FL or FH signal content that could be part of a valid wake-up signal.

If at least one element of a valid wake-up signal, e.g., at least one element of a modulation pattern of a valid wake-up signal, is detected during the relatively short detection phase of the polling period, additional signal analysis is warranted to determine if an wake-up signal is actually present. In the illustrative example, if receiver 38 receives valid FH or FL signals during the detection phase, the receiver 38 transitions to a second low power phase, referred to herein as the signal analysis phase, in which the input signal is analyzed to determine if a valid modulation pattern indicative of a valid wake-up signal is detected. Transition to the signal analysis phase may be immediate or the detection phase may be completed for the predetermined first time interval or number of clock cycles before transitioning to the signal analysis phase. The receiver 38 operates in the signal analysis phase for a predetermined second time interval, which may be programmable. During the signal analysis mode of operation, signal analysis circuitry is enabled to determine if a modulation pattern characterizing a valid wake-up signal, e.g. a required number of transitions between FL and FH, occurs. For example, various counters and summers may be enabled as described below during the signal analysis interval for counting transitions between signal elements defining the wake-up signal modulation pattern.

If the second time interval expires without detecting a valid wake-up signal modulation pattern, e.g. a threshold number of transitions between FL and FH, the receiver 38 will return to a sleep mode at the end of the second time period. However, if a valid modulation pattern indicative of an wake-up signal is detected, for example if a detection threshold number of in-band frequency transitions is detected by receiver 38 during the signal analysis time period, receiver 38 will be transitioned to a full power telemetry mode by control circuitry for establishing a communication session with external unit 18. In a full power telemetry mode, a central processing unit (CPU) is powered up to perform higher power input signal analysis.

In some examples, in addition to the detection threshold number of in-band frequency transitions being reached, other criteria may be required to be satisfied to cause transition to a full power telemetry mode. For example, in addition to the number of FL to FH transitions, criteria for transitioning to a full power telemetry mode may include an analysis of the number of different types of transitions, e.g. transitions from FL to carrier, FH to carrier, OOB to carrier, etc., as will be described in greater detail below.

In a full power mode, a telemetry processing unit is powered up that enables receiver 38 to perform higher level input signal processing and analysis of downlinked data. Such signal analysis may include, for example, identification of the IMD serial number or other device identification and error checking on message streams. Downlink signal data is then provided to IMD circuitry 29 to affect the operation of the IMD 12. In this way, the receiver 38 operates in a manner that reduces the likelihood of unnecessary data analysis by a telemetry processing unit of receiver 38 and reduces the likelihood of a false wake-up (transition to a full power receiving mode) thereby conserving IMD battery power.

In some embodiments, receiver 38 may analyze the signal received by antenna 16 to determine if the carrier signal being transmitted by antenna 20 matches a specified carrier frequency or is skewed high or skewed low. In response to the determined carrier signal frequency, receiver 38 is digitally tuned to match the carrier frequency transmitted by antenna 20 to improve the accuracy of downlink data signal analysis. For example, if a nominal carrier signal frequency is specified as 175 kHz, the FH and FL components of the wake-up signal may be specified as +25 kHz from the carrier signal and −25 kHz from the carrier signal, respectively. The carrier frequency itself, however, may range between approximately 166 kHz (skewed low) to 184 kHz (skewed high). As such, the FH component of the wake-up signal may be between approximately 192 kHz (skewed low) and approximately 210 kHz (skewed high). The FL component of the wake-up signal may be approximately 140 kHz (skewed low) up to approximately 158 kHz (skewed high). Accordingly, receiver 38 is configured to handle these ranges of downlink input frequency characteristics, whether the input signal is at the nominal frequencies or skewed high or skewed low, by digitally tuning the receiver based on input signal analysis, as described further below.

Figure 3A:
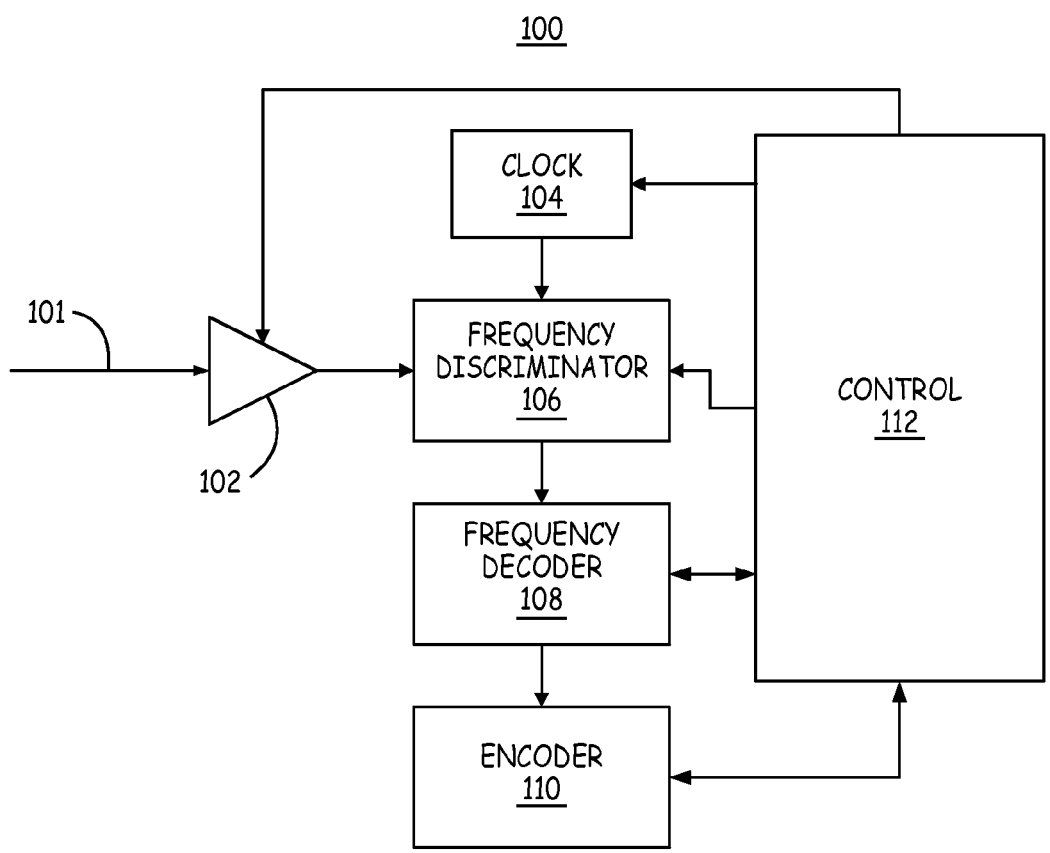
FIG. 3A is a functional block diagram of a receiver included in a medical device communication system according to one embodiment.

FIG. 3A is a functional block diagram of a receiver 100 included in a medical device communication system according to one embodiment. Receiver 100 corresponds to IMD receiver 38 shown in FIG. 2 and optionally receiver 34 of external unit 18. Receiver 100 includes an input comparator 102 for receiving input signal 101 from an associated antenna (not shown in FIG. 3A). Receiver 100 may additionally include an input pre-amplifier and filtering circuitry in some examples. Receiver 100 further includes a clock circuit 104, a frequency discriminator 106, a frequency decoder 108, a data encoder 110, and a control and processing unit 112, hereafter referred to as "control unit" 112.

Control unit 112 may include any one or more of a microprocessor, a controller, a digital signal processor (DSP), an application specific integrated circuit (ASIC), a field-programmable gate array (FPGA), or equivalent discrete or integrated logic circuitry. In some examples, control unit 112 may include multiple components, such as any combination of one or more microprocessors, one or more controllers, one or more DSPs, one or more ASICs, or one or more FPGAs, as well as other discrete or integrated logic circuitry. The functions attributed to control unit 112 herein may be embodied as software, firmware, hardware or any combination thereof. When implemented in software, the functionality ascribed to the systems, devices and techniques described in this disclosure may be embodied as instructions on a non-transitory computer-readable medium such as RAM, ROM, NVRAM, EEPROM, or flash memory, magnetic data storage media, optical data storage media, or the like. The instructions may be executed to support one or more aspects of the functionality described in this disclosure.

Control unit 112 controls the operation of receiver 100 by transitioning receiver 100 between a sleep mode in which the receiver 100 is not enabled to receive and analyze input signal 101, a first low power mode in which the receiver is enabled to detect an element of valid signal input during a detection phase of a polling period, a second low power mode in which the receiver 100 is enabled to analyze input signal 101 for detecting a wake-up signal during a signal analysis phase of a polling period, and a full power mode in which receiver 100 is fully powered up for receiving downlink transmissions and process downlink signal data using a fully powered central processing unit.

Control unit 112 provides control signals to input comparator 102, clock 104, frequency discriminator 106 and frequency decoder 108 as needed to transition receiver 100 between the various operating modes. Clock 104 may be embodied as one or more oscillators providing timing signals for counters and other logic elements included in receiver 100. Frequency discriminator 106 includes counters for counting frequency oscillations of input signal 101 received via comparator 102. Clock 104 provides periodic edges defining counting periods used by frequency discriminator 106 for counting antenna oscillations.

Data from counters included in frequency discriminator 106 are latched at the end of the counting periods and counter values are provided to frequency decoder 108 for determining the input signal frequency. Frequency discriminator counters are then reset at the end of the counting periods. According to one example implementation, a counting period is 80 μs, which is approximately equal to the time associated with sending a single bit of information at a 12.5 Kbps data rate. With reference to the above example, a wake-up signal defined as a 255 ms stream of FSK data shifting between FH intervals lasting approximately 80 μs and FL intervals lasting approximately 80 μs, the frequency discriminator 106 is enabled to count antenna oscillations for determining the input signal frequency for each bit of FSK data.

Clock circuit 104 can be arranged and configured to provide a clock signal having a rising edge every 80 μs using an internal clock period of 80 μs, 40 μs, 20 μs or other sub-period. In one embodiment, clock circuit 104 includes a 50 kHz clock providing a 20 μs clock period used to operate multiple counters included in frequency discriminator 106 in a staggered manner over the 80 μs counting period as will be described further below.

Frequency decoder 108 receives counter states from frequency discriminator 106 and sets logic signals for each counter corresponding to the respective counter state at the end of its respective counting period. Control unit 112 receives the logical signals from decoder 108 and using the logic signals for controlling the operating mode of receiver 100. In particular, control unit 112 controls how long an input signal is analyzed for detecting a valid wake-up signal.

Control unit 112 generates an interrupt signal when a valid wake-up signal is detected to fully power up receiver 100 to establish a communication session with the transmitting device. Control unit 112 sets a carrier frequency select signal which digitally tunes the receiver 100 according to the carrier frequency of input signal 101. In one embodiment, the receiver 100 is tuned to one of three different digital tuning states corresponding to a nominal carrier frequency, a carrier frequency skewed low, or a carrier frequency skewed high.

During a telemetry session, data encoder 110 receives output signals from frequency decoder 108 for setting a received data signal. Encoder 110 may be inactive during a wake-up detection process (or encoder output signals are ignored by control 112). Once a wake-up signal is detected and an interrupt wake-up signal is generated, the encoder uses the output from decoder 108 to set the received data signal for analysis by a processor for reading the received data.

Figure 3B:
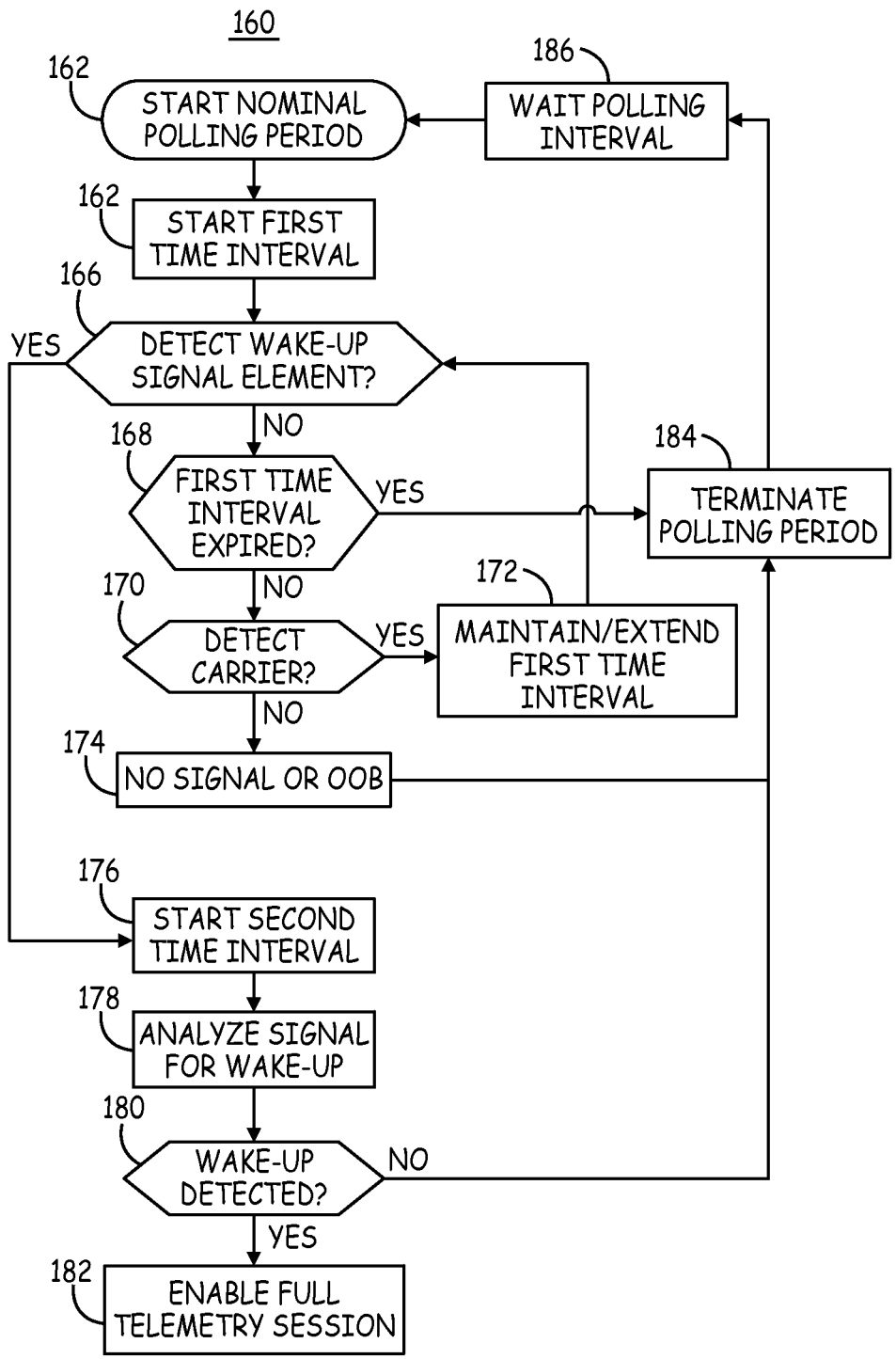
FIG. 3B is a flow chart of a method for operating the receiver shown in FIG. 3A according to one embodiment.

FIG. 3B is a flow chart of a method for operating the receiver 100 shown in FIG. 3A. At block 162 a nominal polling period is started upon expiration of a polling interval. A first time interval is started establishing a detection phase during which the frequency discriminator 106, frequency decoder 108 and control unit 112, using clock signals from clock 104, are configured to determine if an element of a modulated wake-up signal is detected in input signal 101 at block 166. The element of the modulated wake-up signal corresponds to a signal state decoded from the input signal that is one state of a modulated wake-up signal. In the example of a FSK wake-up signal, if a frequency state of FL or FH is detected during the first time interval, additional signal analysis is warranted to determine if a valid wake-up signal is present. The process advances to block 174 and starts a second time period establishing a signal analysis phase.

If an element of the modulated wake-up signal is not detected at block 166, and the first time interval has not yet expired, as determined at block 168, but a carrier signal is detected at block 170, the receiver remains in the detection phase for the full duration of the first time interval, or the time interval may be extended at block 172, to allow additional time to detect FL or FH. If the carrier frequency is detected, a FL or FH signal may follow indicating a possible wake-up signal.

If the carrier signal is not detected at block 170, there is no signal or the signal is out-of-band as determined at block 174. The polling period is terminated at block 184. The receiver waits for the next polling interval to expire at block 186.

If the second time interval is started at block 176 in response to detecting an element of the wake-up signal during the detection phase, the control unit 112 analyzes the output of decoder 108 at block 178 to detect modulation of the input signal 101 corresponding to a wake-up signal definition. Transitions between two or more signal states different than a carrier signal state may be counted for detecting a valid modulation of the input signal. For example, control unit 112 may count frequency transitions between FL and FH states for detecting a wake-up signal defined by n cycles of FH followed by m cycles of FL as described previously. In other modulation schemes, the control unit 112 may analyze a number of amplitude changes, phase shifts, pulse positions, bursts or other aspect of the input signal that is being modulated to define a wake-up signal after detecting one element, i.e. one valid amplitude, phase, pulse position, burst, or other aspect of the input signal during the detection phase.

If a modulation pattern representing the wake-up signal is detected at block 180, prior to expiration of the second time interval, the polling period is terminated and the receiver is transitioned to a full power telemetry session at block 182, which includes powering up a processing unit within control unit 112 for performing relatively higher level input signal data analysis. If the wake-up signal is not detected at block 180, the polling period is terminated and the receiver is powered down to a minimal power or sleep state at block 184. The receiver 100 remains in the sleep state, waiting for the next polling interval to expire at block 186, after which the polling period will be started again at block 162.

Figure 4:
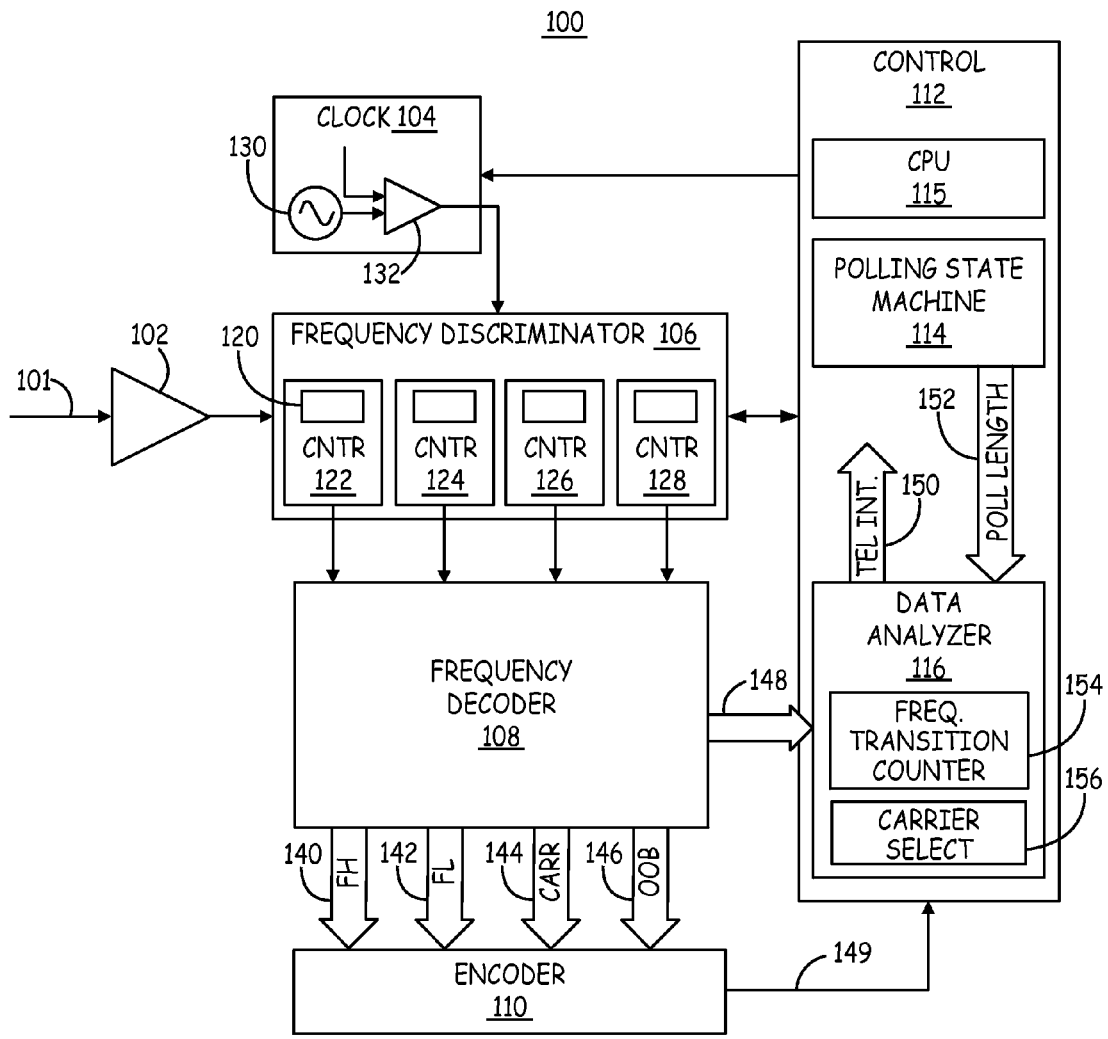
FIG. 4 is a more detailed functional block diagram of the receiver shown in FIG. 3A according to one embodiment.

FIG. 4 is a more detailed functional block diagram of receiver 100 shown in FIG. 3A according to one embodiment. Control unit 112 is shown to include a telemetry CPU 115, polling state machine 114, and data analyzer 116. CPU 115 is a high level processing unit which is powered up by control unit 112 for higher level data analysis during a telemetry communication session enabled in response to detecting a wake-up signal.

Polling state machine 114 controls the state of receiver 100 during polling periods. As described below, polling state machine 114 sets a poll length 152 which controls the length of time that data analyzer 116 is enabled to analyze input signal 101 to detect a wake-up signal.

Frequency discriminator 106 is shown to include four counter circuits 122, 124, 126 and 128. The counter circuits 122 through 128 each include a counter for measuring the input frequency of signal 101 by counting the number of antenna oscillations in an 80 μs bit time. In one embodiment, counters included in counter circuits 122 through 128 are Johnson counters.

In one embodiment, clock circuit 104 includes an analog comparator 132 receiving a signal from oscillator 130. Comparator 132 provides a clock signal to each of the four counter circuits 122, 124, 126 and 128 providing edges for counters 122 through 128 for counting antenna oscillations during a counting period. For example, the output of comparator 132 will go high on the positive portion of a sine wave signal generated by oscillator 130 and low on the negative portion of the sine wave. A 50 Hz clock signal may be generated using other techniques and circuitry, for example, current controlled delay elements may be used to generate rising to falling clock edges that are periodically compared to a crystal oscillator to maintain accurate frequencies of the edges. In one embodiment, clock 104 provides a 50 kHz clock signal for operating each of counters 122 through 128 in quadrature, thereby establishing an 80 μs counting period corresponding to one bit time of input signal data for each counter.

The counter circuits 122, 124, 126 and 128 each include a respective frequency doubler 120 receiving the output from comparator 132. The four frequency doublers 120 are asynchronous such that the resultant four phase clock signal operates the four counters through 128 in quadrature producing counter outputs every one-fourth counting period, e.g. every 20 μs of an 80 μs counting period. Each counter is latched and provides a counter value to frequency decoder 108 at the end of its 80 μs counting period, one counter value every 20 μs. Counter circuits operating in quadrature that may be adapted use in frequency discriminator 106 are generally disclosed in the above-referenced '973 patent.

The frequency doublers 120 included in each counter circuit 122 through 128 enable each counter to measure the frequency of input signal 101 with twice the resolution on each counter, providing greater overall accuracy in detecting FH and FL signals. The greater resolution provided by the frequency doublers 120 also enables better detection of the carrier frequency during the detection phase of the polling period as well as better resolution during the signal analysis phase of the polling period for detecting FH and FL transitions and for analyzing the input signal for digitally tuning of the receiver 100. The greater resolution allows quicker determination for the tuning of the receiver to a correct decoding mode (nominal, skewed high or skewed low), as will be described further below.

Frequency decoder 108 receives counter values from counters 122 through 128 and decodes or translates the counts to a frequency state. The frequency states in one embodiment may include an OOB state in which the signal is determined to be noise, a FL state, a carrier state, and a FH state. Decoder 108 provides digital signal output 148 to data analyzer 116 indicating the decoded states for the four counters at the end of the counting periods. Depending on the modulation scheme used and the defined wake-up signal, multiple in-band states may be defined including two or more states different than a carrier or base signal. In the illustrative embodiments described herein, two in-band frequency states corresponding to FL and FH that are different from each other and from a carrier signal state are used to define the frequency modulated wake-up signal. However it is recognized that a predefined frequency modulated wake-up signal may include two, three or more in-band frequency states different than a carrier frequency state.

In one embodiment, a voting scheme may be used to detect an in-band signal during the detection phase. For example, if a majority of the four counters are in a FL or FH state, the polling state machine 114 detects a valid input signal element corresponding to a frequency state of a predefined frequency modulated wake-up signal and enables data analyzer 116 to analyze the input signal for a second time interval to detect the wake-up signal.

After detecting FL or FH content during the detection phase, the polling state machine controls the data analyzer 116 to operate in a signal analysis state. Data analyzer 116 includes frequency transition counters 154 and carrier select module 156. Frequency transition counters 154 receive decoded signal output 148. Frequency transition counters 154 include a number of counters and summers used to count the frequency state transitions made by frequency discriminator counters 122 through 128 during the signal analysis phase. Data analyzer 116 performs a comparative analysis of the values of the frequency transition counters 154 at the end of the signal analysis phase to determine if detection threshold requirements are met for detecting a wake-up signal.

In one embodiment, data analyzer 116 sums the number of times the counters transition from any state to the carrier state to obtain a count of the frequency transitions that arrive at the carrier frequency. Data analyzer 116 also sums the number of times the counters transition from FL to FH, including transitions that occur directly from FL to FH and transitions that occur from FL to any other state (e.g., noise or carrier) to FH. In alternative embodiments, the number of transitions from FH to FL could be counted, additionally or alternatively to counting FL to FH transitions.

Transition counts are compared to threshold conditions for generating a telemetry wake-up interrupt as will be described further below. In this way, polling state machine 114 controls data analyzer 116 to operate in a first low power mode for a detection phase of the polling period for generally detecting in-band signal content and, in response to detecting in-band signal content, controls data analyzer 116 to operate in a second low power mode for a signal analysis phase of the polling period for detecting frequency transitions corresponding to a wake-up signal or other valid modulation of the RF signal corresponding to a predefined wake-up signal.

If a wake-up signal is detected during the signal analysis phase, data analyzer issues a telemetry interrupt signal 150. Control unit 112 responds to the interrupt signal 150 by enabling receiver 100 for a telemetry communication session, including powering up CPU 115. Additionally, in some embodiments carrier select 156 sets a decoding mode to be applied by frequency decoder 108 during the communication. In one embodiment, selection of the decoding mode as nominal, skewed high or skewed low is based on a comparative analysis of the frequency transition counters 154 as described further below. The receiver 100 is tuned to the carrier frequency of input signal 101 for greater accuracy in frequency discrimination during the communication session.

In one embodiment, frequency transition counters 154 includes three sets of data analyzer counters corresponding to each of a skewed high, skewed low and nominal carrier decoding mode. These decoding modes will be described in conjunction with FIG. 5. Each set of counters counts the FL to FH transitions and transitions to the carrier signal according to the respective decoding mode. A shared OOB transition counter is used for all three decoding modes in one embodiment. A set of frequency transition counters counting the greatest number of transitions is identified and a carrier select signal 156 indicates the decoding mode to be used by decoder 108 during a telemetry session. In this way, the receiver 100 is tuned to a carrier frequency of input signal 101 for a subsequent telemetry session.

Upon detection of a wake-up signal during the signal analysis phase, receiver 100 transitions to a full-power communication mode. The selected decoding mode is used in determining the decoded frequency state of the counters 122 through 128. Encoder 110 receives the decoded outputs 140 through 146 corresponding to states of the four counters 122 through 128 from decoder 108. Encoder 110 derives a received data signal 149 from the four decoded values. In one embodiment encoder 110 receives a FH signal 140, a FL signal 142, a CARR signal 144 and an OOB signal 146 corresponding to the number of counters 122 through 128 in the respective FH, FL, CARR or OOB states based on the selected decoding mode.

Encoder 110 may operate a voting scheme to set an overall input signal state according to a "majority vote" of the signals 140 through 146. To illustrate, if at least 3 of the four counters 122 through 128 are in a decoded FH state according to a selected decoding mode, then the encoder provides a received data signal 149 to control unit 112 corresponding to a FH input signal. If the majority of the decoded values are in FL state, then encoder 110 provides a received data signal corresponding to a FL input signal. If the number of decoded values in a FH state equals the number of decoded values in a FL state, then the received data signals provided by encoder 110 to control 112 are held at their previous values.

The encoder 110 may include a flip flop to receive decoder input signals on the opposite clock edge as the clock edge used by decoder 108 for setting decoded counter values. The received data signal provided to control 112 during full processing communication mode is tuned to the input carrier frequency and as a result provides a received data signal to control 112 corresponding to an accurate input signal frequency. The CPU 115 receives the received data signal 149 to analyze an incoming telemetry data signal stream.

FIG. 5 is a table 200 of decoded counter values used by frequency decoder 108 according to one embodiment. Table 200 will be described with continued reference to FIG. 4. Values of all four frequency discriminator counters 122 through 128 at the end of respective counting periods are decoded to bit values representing FH, FL, carrier, or out of band (OOB) signal content.

The illustrative example shown in FIG. 5 pertains to the example of using a nominal carrier frequency of 175 kHz and a wake-up signal employing a nominal FL of 150 kHz and nominal FH of 200 kHz. It is recognized, however, that other carrier frequencies and modulation protocols can be used for a downlink wake-up signal. Additionally, in the examples described herein, a 50 kHz clock is used to correspond to an 80 μs bit time however other bit rates and clock cycle times may be employed. Decoded counter values may be adapted for a particular implementation of the disclosed techniques in accordance with the selected downlink signal frequency protocol and clock circuitry.

A counter state 202 is based on the number of antenna oscillations counted by a given counter during its respective counting period. The counter value may be provided as a HEX value to decoder 108 and corresponds to a state 202 for a given antenna oscillation frequency 204 over the entire counting period. A counter state of 0 corresponds to a counter reset state at the end of each counting period. A counter state between 1 and 20, corresponding to a count of antenna oscillations between 6,250 and 125,000 in the counting period translates to a frequency that is below the valid signal band, i.e. below the specified range of FL. Decoder 108 will set an OOB signal 146 (in FIG. 4) high to indicate noise as shown in column 208.

For a nominal carrier frequency decoding mode (see column 210), a counter state between 21 and 27, corresponding to a count between 131,250 and 168,750 at the end of a counting period (see column 204), corresponds to a FL state. A FL signal 142 (FIG. 4) from decoder 108 will be set high to indicate a FL state for the given counter for the current counting period. State 28, corresponding to a count of 175,000 (the nominal carrier frequency), will cause a carrier signal output 144 of decoder 108 be set high to indicate carrier signal.

In response to a counter value at the end of the counting period ranging between 181250 and 218750 (column 204) for states 29-35 under the nominal carrier signal decoding mode (column 210), decoder 108 will set a FH signal 140 (FIG. 4) high indicating FH input signal content for the current clock cycle. States 36-39, having counts greater than 225,000 produce an OOB signal 146 (FIG. 4) indicating noise. The counters 122 through 128 may be latched at a maximum count of 39 corresponding to 243,750 Hz such that the counters will not go beyond this count.

During the polling period, all three sets of frequency transition counters 154 of data analyzer 116 are used to count transitions between frequency states decoded according to each of the nominal 210, skewed low 212, and skewed high 214 states. A set of the transition counters 154 corresponding to a decoding mode resulting in the highest frequency transition counts is identified and used to set the decoding mode used to provide signals 140 through 146 to encoder 110 during a telemetry session.

The nominal decoding mode represented in column 210 has been discussed above. If the skewed low decoding mode 212 is selected, the frequency decoder 108 will decode a frequency count of 168,750 as a carrier signal and generate a carrier output signal 144 indicating so. A frequency count corresponding to 175,000 Hz, which is decoded as the carrier signal for nominal decoding mode 210, is decoded as FH during the skewed low decoding mode. Decoder 108 will generate a FH output signal 140.

If the skewed high decoding mode 214 is selected, a frequency count of 175,000 Hz corresponding to state 28 will result in a FL output signal 142. State 29 corresponding to frequency count of 181,250 Hz will result in a carrier output signal 144. As such, depending on the selected tuning of the digital frequency decoder 108, the states of the FH output signal 140, FL output signal 142 and carrier output signal 144 will vary for the frequency states 27, 28 and 29 surrounding and including the nominal carrier signal, 175 kHz in this example. Each of the FH, FL and carrier output signals 140, 142 and 144 may represent how many of the frequency discriminator counters 122 through 128 are in the corresponding FH, FL and carrier states. The OOB signal 146 may be set high if any one of the counters is in an OOB state or may represent a number of counters in an OOB state.

Column 206 of FIG. 5 represents the frequency count at a half counting period for a given counter, e.g. at 40 μs for an 80 μs counting period. The counts for each counter at the half counting period are provided as input for determining the OOB signal 146 provided to encoder 110 during a telemetry session and provided in decoder signal output 148 to data analyzer 116 during polling periods. The decoded values of the counter states based on the counts at the end of a counting period (column 204) assume the input signal is a continuous, sinusoidal frequency spread over the entire counting period. This situation may not always be the case. For example, if a 350 kHz signal is received during the first half of the counting period and no signal is received for the second half of the counting period, the count at the end of the counting period would indicate a frequency of 175 kHz or nominal carrier for the entire counting period. To improve discrimination between FH, FL and carrier signal content and noise/OOB signal content, the counter values are monitored at the half counting period as indicated by column 206.

The frequency counts in column 206 indicate the expected frequency count at the end of the counting period based on the count at the half counting period. If the frequency count at the half counting period is already into the FH or FL range, then the input signal cannot be in the valid frequency band. The OOB signal indicator 208 indicates a fast-slow (FS) signal for states 21 through 35 when the half-period count indicates a count already in the in-band range. The input signal may be varying between bursts of high frequency and low frequency due to noise resulting in a full clock cycle count that falls within the FL, FH or carrier range. To discriminate this type of noise from valid input signals, the half-cycle counts are monitored to provide the OOB signal 146 from decoder 108.

Conversely, for a slow input signal the counter may reach only one of states 1 thru 7 at the half counting period. If FH input is received during the second half of the counting period, the frequency input over the entire counting period is too slow to reach a count value corresponding to states 29 thru 35. For example if a counter reaches state 7 at a 40 µs half-cycle and the input signal then goes to FH for the second half period, the counter could reach a count value in states 21 through 27 corresponding to a FL state. The count at the end of the counting period would erroneously result in a FL output signal 142 from decoder 108. The FL decode signal output would be incorrect since the signal was actually FH but only for half the counter period with the first half of the counting period being low frequency OOB input signal. Decoder 108 therefore provides an OOB state 208 which takes into account the counter state mid-way through the counting period. Since the half-period counter value is too low for a valid in-band signal, decoder 108 generates an OOB signal state 208 indicating a FS (fast-slow) input.

Data analyzer 116 receives the decoder signal output 148 including the frequency state of each counter according to all three decoding modes 210, 212 and 214 and an OOB signal state 208 for each counter. Data analyzer 116 counts the signal states and transitions between these states for all four counters. If all 4 counters indicate a carrier signal as defined by any of the nominal, skewed low or skewed high states, i.e. if all four counters are in states 27 through 29, a carrier wide signal is generated by data analyzer 116. If one or more counters result in an OOB signal, a telemetry OOB signal is generated by data analyzer 116. The data analyzer 116 sweeps a signal analysis phase by monitoring the decoder signal states and counting frequency transitions.

Figure 6:
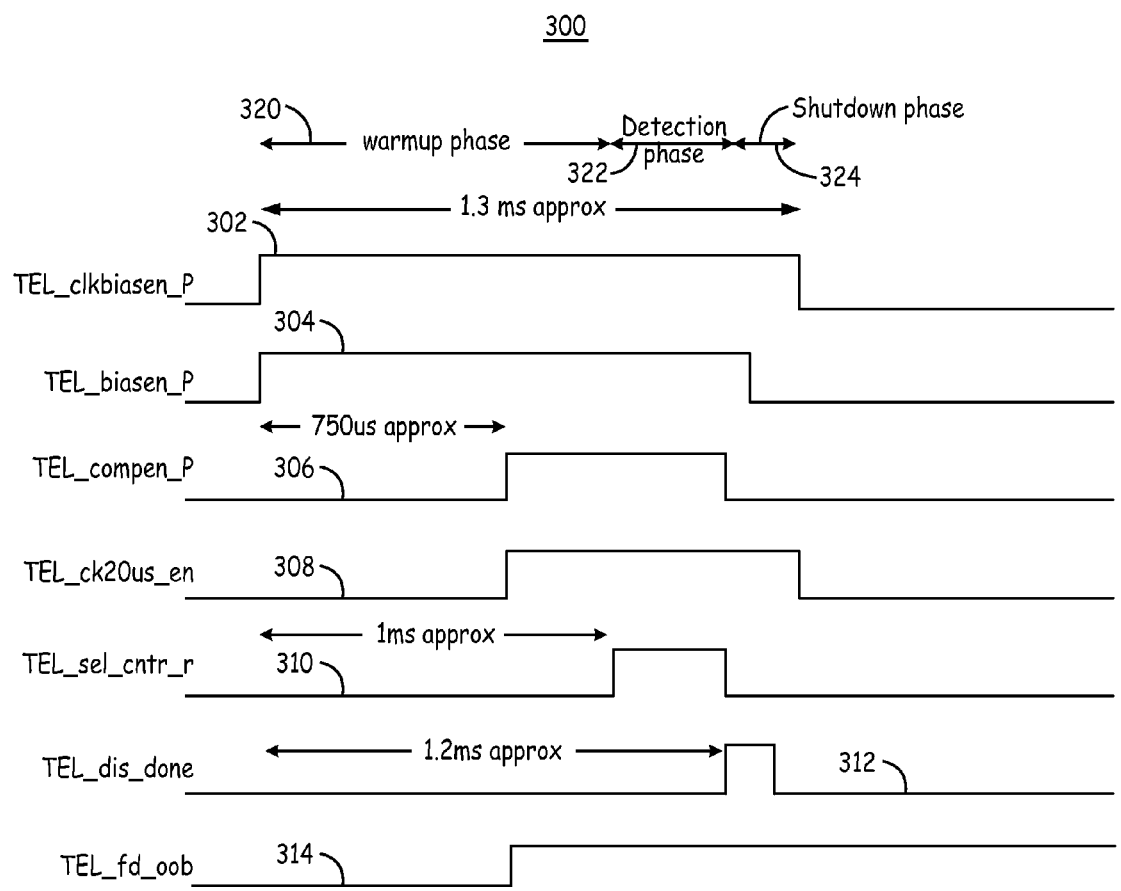
FIG. 6 is a timing diagram illustrating signals generated by the receiver control unit to initiate a polling period and in response to no valid input signal received during the polling period.

FIG. 6 is a timing diagram 300 illustrating signals generated by the receiver control unit 112 to initiate a polling period and in response to no valid input signal received during a detection phase of the polling period. Upon expiration of the nominal polling interval, a polling period is initiated by control unit 112 by setting a clock control signal 302 (TEL_clkbias_en_P) high to enable the oscillator 130 of clock circuit 104. A bias signal 304 (TEL_biasen_P) is applied to the input comparator 102. These signals 302 and 304 are provided during a warm-up phase 320 to ensure the clock circuit 104 provides an accurate clock signal to frequency discriminator 106 and decoder 108 for establishing the counting periods during the detection phase 322 of the polling period.

Near the end of the warm up phase 320, a comparator enable signal 306 (TEL_compen_P) and a clock enable signal 308 (TEL_ck20us_en) go high to enable comparator 102 that receives the downlink antenna input signal and the clock circuit 104 that provides a clock signal to frequency discriminator 106 and decoder 108. At the start of a detection phase 322, a reset signal 310 (TEL_sel_cntr_r) is provided to reset the various frequency transition counters included in data analyzer 116.

During the detection phase 322, the data analyzer 116 monitors the decoded states of the four counters of frequency discriminator 106 to detect in-band signal content. In the example shown, the input signal is out-of-band, which is either noise or fast-slow signal content as defined in column 208 of FIG. 5. The data analyzer 116 generates a frequency discriminator OOB signal 314 (TEL_fd_oob) that is set high in response to at least one of the frequency discriminator counters 122 through 128 being in an OOB state. In one embodiment, all the counters have no count and at the beginning of their respective 80 µs counting periods and are thus in an OOB state. At respective 40 µs (half the counting period) and 80 µs (a full counting period) intervals, each of the counter outputs are latched and an OOB determination is made by a logical OR operation of the latched counter states to generate the TEL_fd_oob signal. In this way, TEL_fd_oob is updated every 20 µs as each counter (122, 124, 126, 128) completes its analysis.

In response to the frequency discriminator OOB signal 314, the polling state machine generates a polling termination signal 312 (TEL_dls_done), which terminates the detection phase 322. During a shut down phase 324, the clock circuit 104, the frequency discriminator 106, decoder 108 and data analyzer 116 are disabled or put back into a minimum power mode until the next nominal polling interval expires.

The timing diagram 300 represents the operation of receiver 100 most of the times a polling period is initiated because the vast majority of the time there will be no valid input signal to analyze so the receiver immediately goes back to a sleep state after the detection phase 322. The detection phase 322 may be terminated immediately upon the frequency discriminator OOB signal being set high, prior to expiration of a maximum detection phase time interval. The detection phase 322 may have a minimum time interval or number of clock cycles in some embodiments.

The warm-up phase 320 is long enough such that the clock is running and valid at 1 ms. Past 1 ms enough clock cycles occur such that each of the frequency discriminator counters has had a full 80 µs time window with a valid comparator input and an accurate running clock. Valid data is available immediately from the counters at the start of the detection phase 322. For example, as seen in FIG. 6, TEL_fd_oob 314 can go high as soon TEL_compen_P goes high, TEL_ck20us_en is high, the 50 kHz clock is running, and the first 40 µs clock edge for one of the four frequency discriminator counters operating in quadrature occurs.

Figure 7:
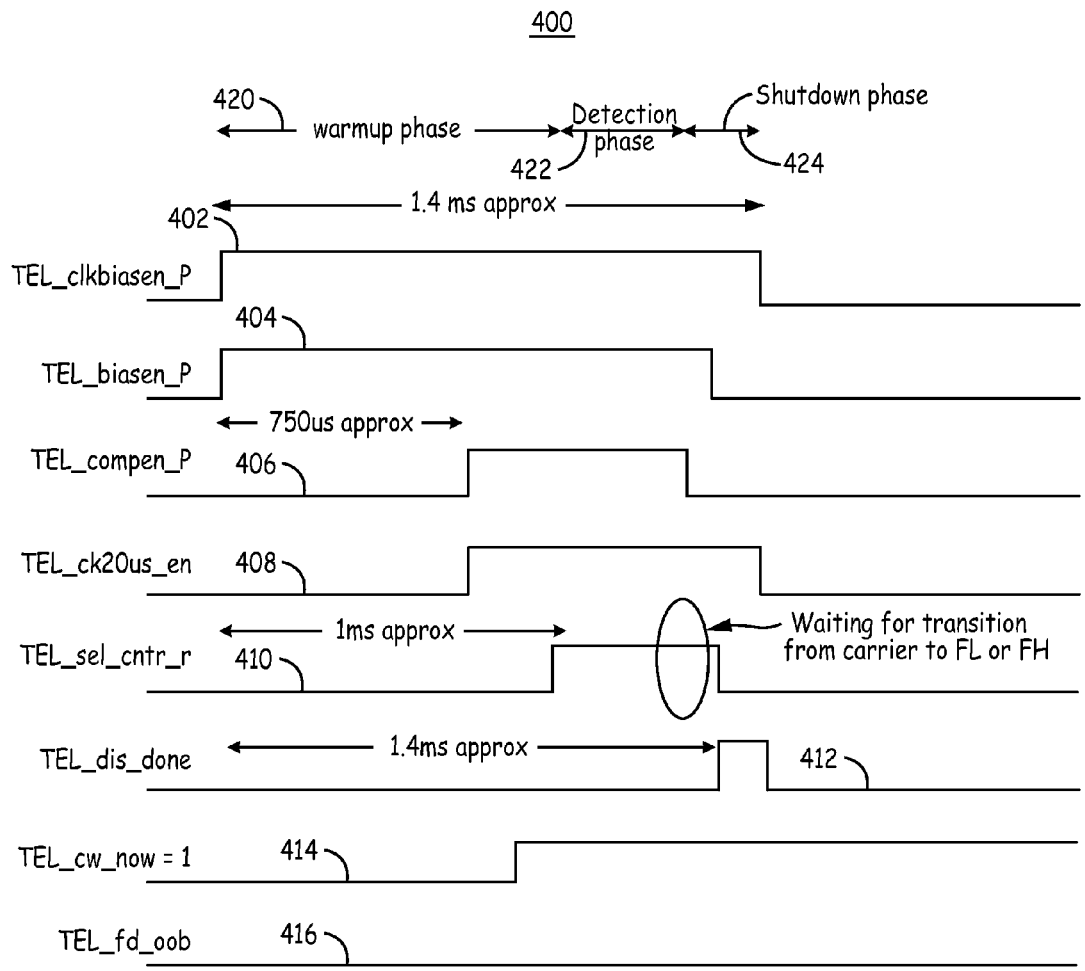
FIG. 7 is a timing diagram illustrating signals generated by the receiver control unit to initiate a polling period and in response to carrier signal received during the polling period.

FIG. 7 is a timing diagram 400 illustrating signals generated by the receiver control unit 112 to initiate a polling period and in response to carrier signal received during the detection phase of the polling period. The signals 402, 404, 406 and 408 operate in a similar manner as described above during a warm-up phase 420 and detection phase 422 for warming up and enabling the receiver clock circuit 104 and comparator 102 receiving the antenna input signal. In this example, an input signal at the carrier frequency is received such that all of the frequency discrimination counters are in one of the carrier states 27, 28, and 29 (Table 200, FIG. 5). The data analyzer 116 sets a carrier wide signal 414 (TEL_cw_now) high. The carrier wide signal is the logical AND of the four decoded CARR signals received from decoder 108. If all four counters are in states 27 through 29, the data analyzer carrier wide signal 414 is high.

In response to the carrier wide signal 414 going high, and the frequency discriminator OOB signal 416 remaining low (no frequency discriminator counters in an OOB state), the polling state machine 114 provides data analyzer 116 a poll length signal 152 (shown in FIG. 4) maintaining the receiver in the detection phase 422. The detection phase 422 may be extended in response to detection of the carrier signal content to detect a FL or FH transition from the carrier state. Data analyzer 116 remains enabled for analyzing the decoded counter values for an extended detection phase 422 in response to detection of a signal anywhere within the carrier signal bandwidth, including the skewed low to skewed high carrier signal frequencies, in some embodiments. Note that in FIG. 7, the data analyzer 116 is enabled longer than in FIG. 6 because there is a signal present near the carrier frequency. The data analyzer 116 remains enabled to wait for the signal to transition from carrier to FL or FH. In an 80 μs cycle, the input signal could be half the time at FL and the other half at FH and therefore be decoded as a carrier. Hence if the decoded signal is at the carrier frequency, then an extended detection phase enables a true detection of FL and/or FH input.

The detection phase 422 may be defined prospectively to be a maximum time interval in response to the carrier wide signal 414 such that the receiver remains in the detection phase 422 for the entire time interval. In this case, a frequency discriminator OOB signal 414 being set high, as shown in FIG. 6, may cause termination of the detection phase 422 prior to expiration of the maximum detection phase time interval. The detection phase is terminated in response to a polling termination signal 412 (TEL_dls_done) set by polling state machine 114 in response to no FH or FL content being detected during the detection phase 422. The receiver enters a shut down phase 424 in which the wake-up detection circuitry is powered down.

Alternatively, the detection phase 422 may be defined to have a minimum time interval or number of clock cycles. If the frequency discrimination OOB signal 414 is high during the minimum number of clock cycles, the detection phase is terminated by polling state machine after the minimum number of clock cycles. If the carrier wide signal is set high as shown in FIG. 7, and the frequency discriminator OOB signal 416 is low, the detection phase 422 may be extended by polling state machine 114. In one embodiment, the detection phase is set to a minimum of one clock cycle and a maximum of nine clock cycles of a 50 kHz clock. The detection phase is terminated early in response to a frequency discriminator OOB signal being set high by data analyzer 116 and is maintained for the full nine clock cycles in response to the carrier wide signal being set high and the frequency discriminator OOB signal being low. The time intervals of the timing diagrams shown in FIGS. 6 through 9 are examples and should not be considered limiting.

Figure 8:
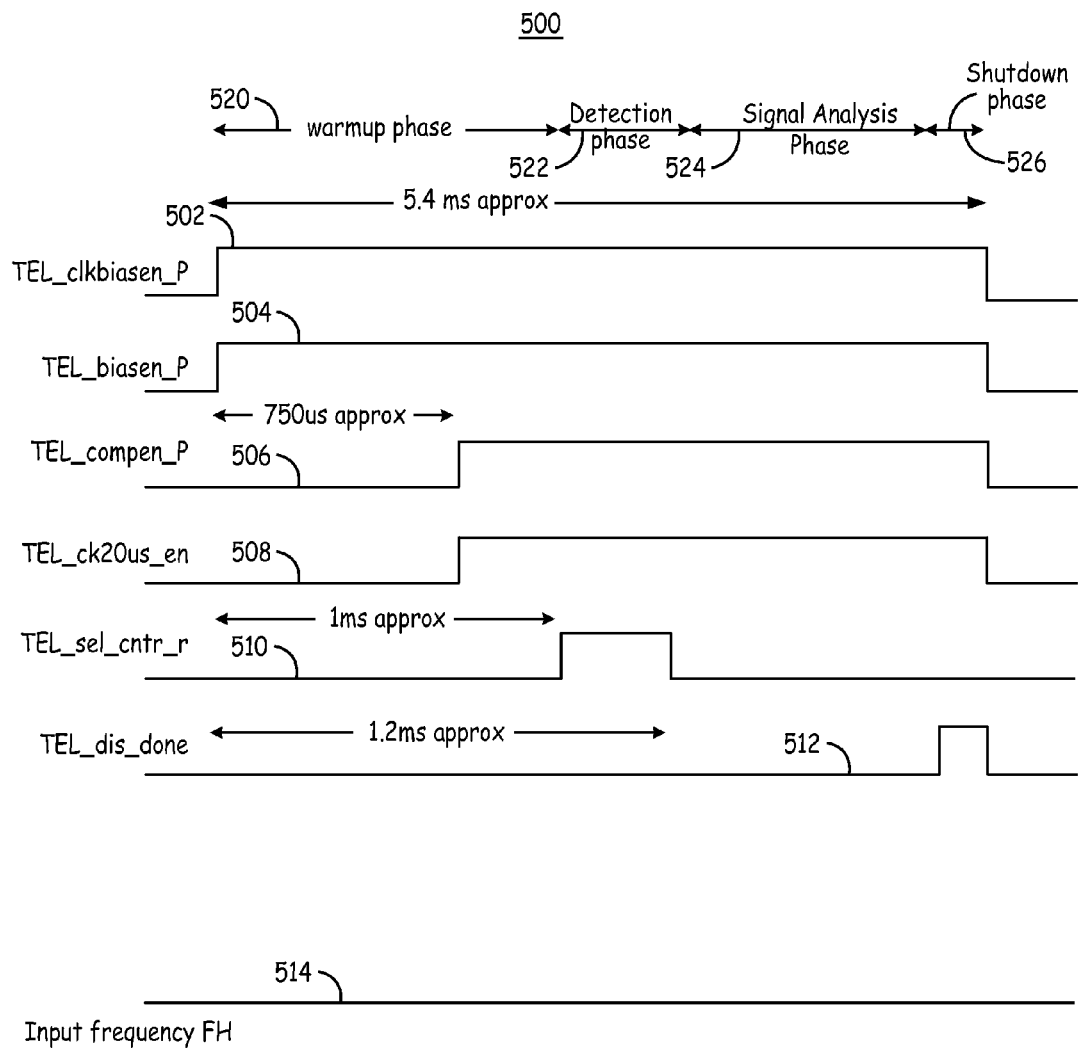
FIG. 8 is a timing diagram illustrating signals generated by the receiver control unit to initiate a polling period and in response to FH signal content received during the polling period.

FIG. 8 is a timing diagram 500 illustrating signals generated by the receiver control unit 112 to initiate a polling period and in response to FH signal content received during the polling period. Signals 502, 504, 506 and 508 for biasing and enabling the input comparator 102 and clock circuit 104 are generated during the warm-up phase 520 as described previously. The data analyzer counter reset signal 510 goes high to reset the data analyzer counters at the start of the detection phase 522.

A FH input signal 514 is received during the polling period. In response to detecting the FH signal during the detection phase 522, the polling state machine 114 extends the polling period by a signal analysis phase 524 to allow data analyzer 116 to analyze the input signal for an extended time period for detecting FL to FH transitions and a wake-up signal. The signal analysis phase 524 may be a fixed or programmable interval that is started in response to detecting either FH or FL signal content during the detection phase 522. Accordingly, if any of the decoded frequency discriminator counter signals indicate FH or FL content during the detection phase 522, with no decoded OOB signal (the frequency discriminator OOB signal is low), the polling period is extended by initiating the signal analysis phase 524. In some embodiments, a minimum number of the frequency discriminator counters, e.g. n of m counters, must be in a FH (or FL) state to cause the polling state machine to initiate the signal analysis phase 524. The signal analysis phase may extend the polling period by at least approximately 1 ms or more, e.g. approximately 4 ms, in some examples. If the FH (or FL) signal content is detected prior to the end of the detection phase 522, the polling state machine may terminate the detection phase 522 and initiate the signal analysis phase 524 prior to the expiration of a maximum detection phase.

During the signal analysis phase 524, frequency transition counters 154 are enabled to count transitions of the states of frequency discriminator counters 122 through 128. If the frequency transition counters do not reach a detection threshold count of FL to FH transitions (or FH to FL transitions or combination of both FL to FH and FH to FL) during the signal analysis phase 524, the polling state machine 116 issues a polling termination signal 512 (TEL_dls_done) to end the polling period. In response to the polling termination signal 512, the control unit 112 triggers a shut-down phase 526 returning the receiver 100 to a sleep state to wait for the next nominal polling interval to expire. The polling state machine 114 is disabled and control of the receiver 100 is returned to control unit 112.

Figure 9:
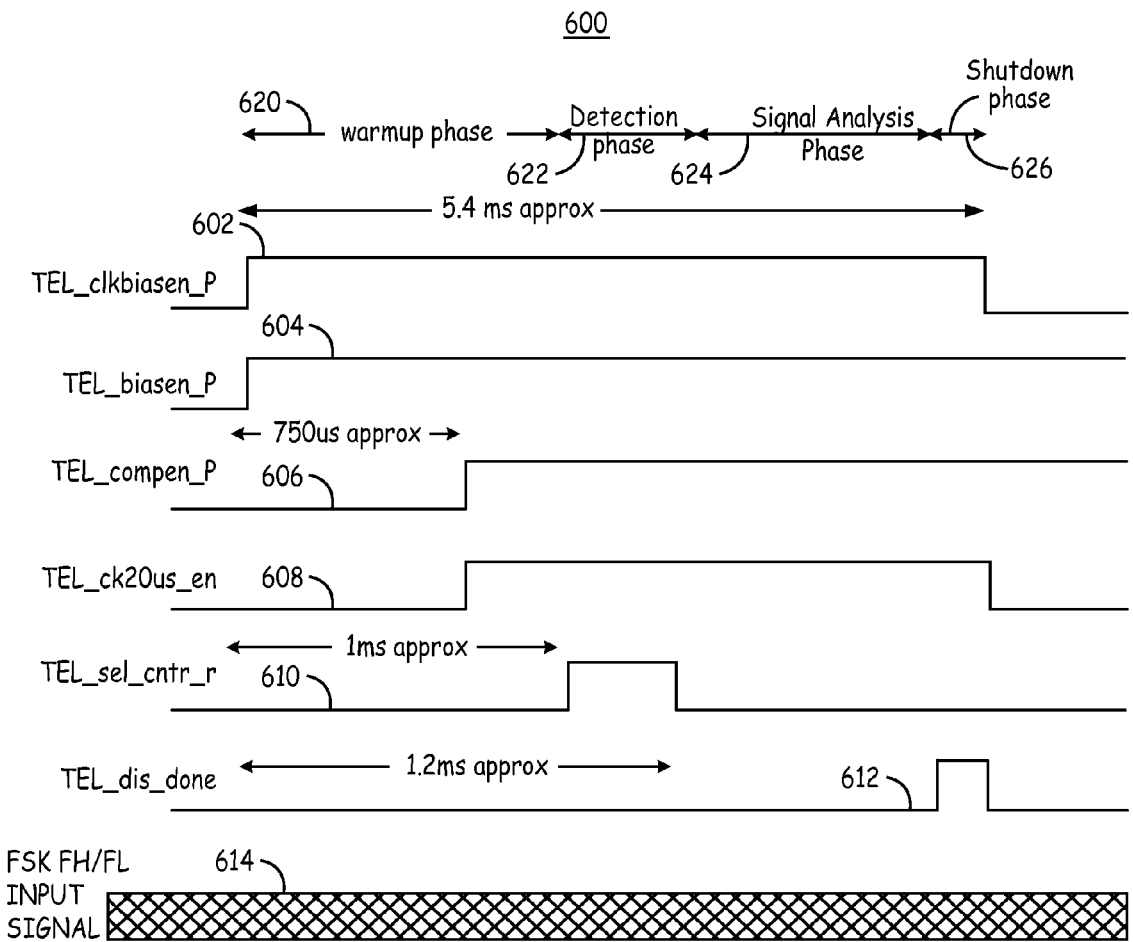
FIG. 9 is a timing diagram illustrating signals generated by the receiver control unit to initiate a polling period and in response to FL and FH signal content received during the polling period.

FIG. 9 is a timing diagram 600 illustrating signals generated by the receiver control unit 112 to initiate a polling period and in response to a wake-up signal received during the polling period. Signals 602, 604, 606 and 608 for biasing and enabling the input comparator 102 and clock circuit 104 are generated during the warm-up phase 620 as described previously. The data analyzer counter reset signal 610 goes high to reset the data analyzer counters at the start of the detection phase 622.

The input signal 614 in this example is FSK signal corresponding to a specified wake-up signal including alternating periods of FH and FL as described previously. During the detection phase, FH and/or FL signal content will be detected based on the decoded frequency discriminator counters. The polling state machine 114 will provide data analyzer 116 with a poll length signal 152 to extend the polling period by the signal analysis phase 624. The data analyzer frequency transition counters accumulate counts of frequency transitions during the signal analysis phase 624. If the frequency transition counters reach threshold requirements for detecting the wake-up signal input signal 614, a telemetry interrupt signal 612 (TEL_dls_irq) is generated by data analyzer 116.

During the shutdown phase 626, the clock bias and enable signals 602 and 608 go low, disabling the clock signal provided to the frequency discriminator 106 and decoder 108 during the detection and signal analysis phases 622 and 624.

A different clock, which is continually trimmed (or needs no trimming) and hence more accurate, may be enabled for high level analysis performed by data analyzer 116 during the ensuing telemetry session. Alternatively the same clock could be used during both wakeup detection and telemetry session; this clock may or may not require the TEL_clkbiasen_P 602 and TEL_ck20us_en 608 signals. The bias and enable signals 604 and 606 will remain high after the shutdown phase 626 to maintain the input comparator 102 in an enabled state for receiving the input signal from the receiver antenna. Transmitted signals received by receiver 100 are then analyzed by data analyzer 116 and/or other processing unit included in control unit 112. CPU 115 included in control unit 112 is fully powered up in response to the telemetry interrupt signal 612 for performing higher level input signal analysis. Control of receiver 100 is returned to control unit 112 and polling state machine 114 is disabled during the shutdown phase 626.

Figure 10:
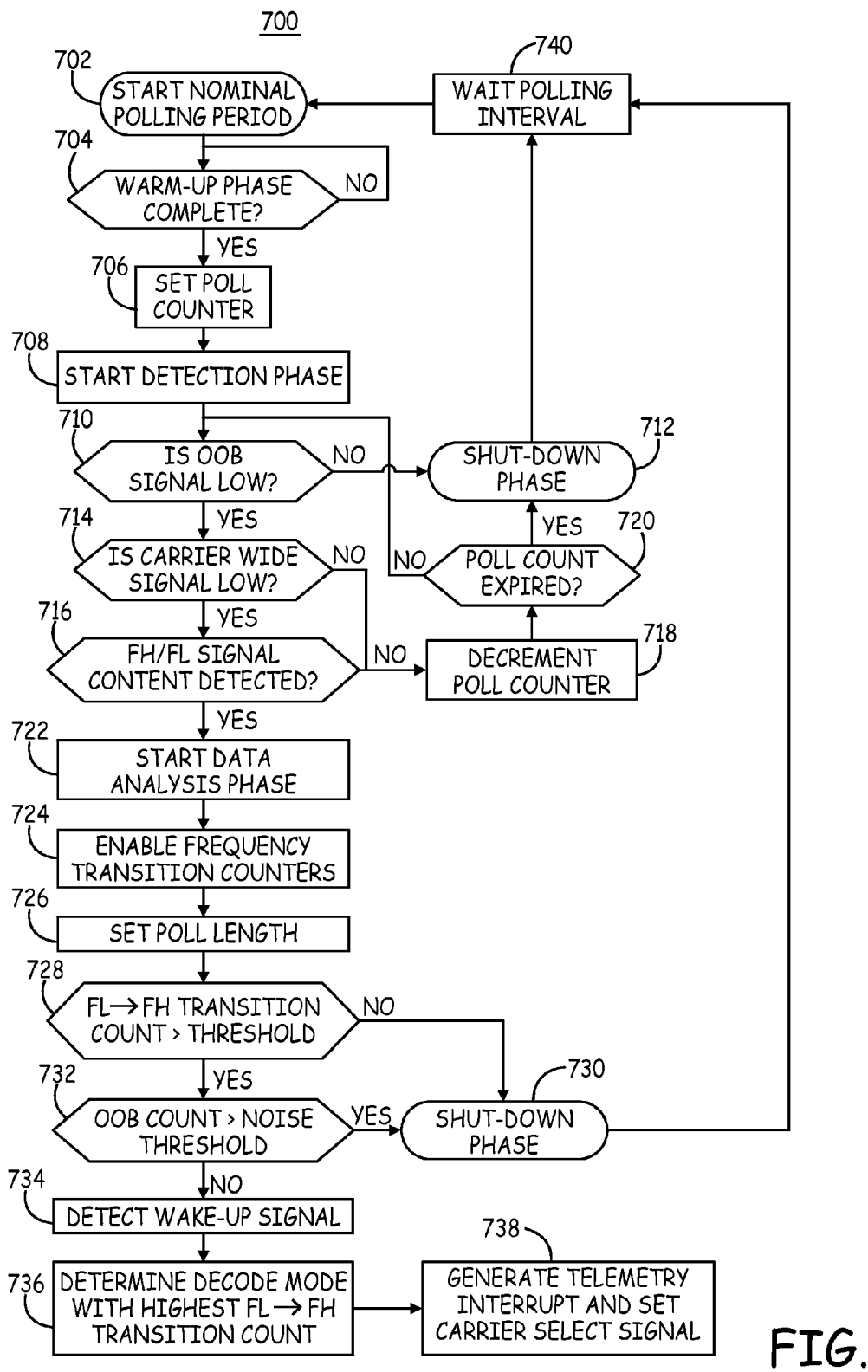
FIG. 10 is a flow chart of a method of controlling an RF receiver included in a medical device communication system according to one embodiment.

FIG. 10 is a flow chart 700 of a method for controlling an RF receiver included in a medical device communication system according to one embodiment. At block 702, a polling period is started upon expiration of a nominal polling interval, e.g. every 250 ms. The control unit 112 of receiver 100 starts a warm-up phase by setting clock and comparator bias signals high followed by enable signals as shown in FIGS. 6-9. The comparator 102 is enabled to receive signals from an associated antenna, and the clock circuit 104 is enabled to provide clock signals to frequency discriminator 106, decoder 108 and polling state machine 114 and signal analyzer 116.

When the warm-up phase is complete as determined at block 704, the polling state machine sets a poll counter at block 706 to a maximum number of clock cycles to establish a detection phase of the polling period. For example, when a 50 μs clock is used, the polling state machine may set a detection phase to 8 to 12 clock cycles though other detection phase lengths may be used. At block 708, the detection phase is started, which includes resetting any counter values used by data analyzer 116.

After starting the detection phase, the decoded data output signals 148 for each of the four counters 122-128 included in frequency discriminator 106 are received by data analyzer 116 from decoder 108. The states of the four counters of the frequency discriminator are monitored by data analyzer 116 during the detection phase. If any of the frequency discriminator counters 122 through 128 are in an OOB state, as determined at block 710, the data analyzer 116 sets a frequency discriminator OOB signal high. If the frequency discriminator OOB signal remains high for a predetermined number of clock cycles, which may be at least one clock cycle, the detection phase is terminated by the polling state machine 114 which sets a polling termination signal.

In response to the polling termination signal, the control unit 112 transitions to a shut down phase at block 712, which includes setting the clock and comparator bias and enable signals low, e.g. as shown in FIG. 6. The receiver CPU 115 is never powered up for input signal analysis and minimum battery current is used before returning the receiver to a sleep state. The data analyzer 116 sets the decoding mode used by decoder 108 to be the nominal carrier frequency (e.g. as shown by column 210 of FIG. 5), though no further input signal analysis will be performed until the next nominal polling interval expires. The polling period is terminated and the process returns to block 740 to wait until the next polling interval expires, after which the nominal polling period would restart again at block 702.

If no OOB signal state is detected at block 710, the decoder output signals 148 are monitored for carrier signal states of the four counters 122-128 at block 714. In one embodiment, if all four counters are in a carrier signal state (e.g. states 27-29 in FIG. 5), the data analyzer 116 sets a telemetry carrier wide signal high. A poll counter is decremented at block 718 at the end of each clock cycle for which the carrier wide signal remains high. If the poll count expires (block 720), indicating expiration of a maximum number of clock cycles during the detection phase, the polling state machine 115 sets the telemetry polling done signal high. The control unit 112 transitions the receiver 100 into the shut-down phase at block 712 as described in conjunction with FIG. 7. Presence of carrier signal causes monitoring of the input signal for a longer time interval, i.e. until expiration of the poll count, than an OOB signal which cause termination of the detection phase prior to expiration of the poll count setting the detection phase time interval.

If the data analyzer OOB signal and the carrier wide signal are low (blocks 710 and 714) during the detection phase and FH and FL signal content is detected (block 716) during the detection phase prior to expiration of the poll countdown, the poll state machine 114 triggers a signal analysis phase at block 722. The poll state machine 114 transitions to a signal analysis phase and sets an extended polling period by providing data analyzer 116 with a poll length signal 152.

In one embodiment, frequency transitions are not counted during the detection phase. In this way, fewer counters and less power is used by data analyzer 116 during the detection phase. During the data analysis phase, frequency transition counters 154 are enabled at block 724. These transition counters sum the number of frequency transitions of the four frequency discriminator counters during the extended polling interval, i.e. second polling period time interval corresponding to the detection phase, set at block 726 by polling state machine 114.

One type of frequency transition counter sums the number of transitions from any counter state to the carrier state. During the signal analysis phase, the data analyzer 116 uses decoded signals from decoder 108 in all three decoding modes, nominal, skewed low and skewed high. This enables data analyzer to make a determination as to whether the carrier signal is at the nominal carrier frequency or skewed high or low. Accordingly, one frequency transition counter sums the number of transitions from any counter state to the carrier state for the nominal decoding mode (column 210 in FIG. 5); a second frequency transition counter sums the number of transitions from any counter state to the carrier state for the skewed low decoding mode (column 212 of FIG. 5), and a third frequency transition counter sums the number of transitions from any counter state to the carrier state for the skewed high decoding mode (column 214 of FIG. 5). In this embodiment, three different frequency transition counters operate to sum all frequency transitions of all four discriminator counters from any state to the carrier frequency for each of the three respective decoding modes.

Another type of frequency transition counter included in counters 154 sums the number of transitions from FL to FH either directly, i.e. FL state to FH state with no intervening states, or indirectly, i.e. FL to any other state(s) to FH. Again, a frequency transition counter for each of the three decoding modes operates during the signal analysis phase to count the FL to FH transitions in each of the nominal, skewed low and skewed high decoding modes.

A third type of frequency transition counter sums the number of times any of the frequency discriminator counters 122 through 128 transition from any state to an OOB state, including both noise and the FS states as listed, for example, in column 208 of the decoding table of FIG. 5. Since the noise and FS states are defined the same for all three decoding modes (as seen in column 208 of FIG. 5), a single OOB transition counter is used in one embodiment.

The frequency transition counter values are compared to wake-up signal detection requirements at the end of the signal analysis phase time interval set at block 726. If none of the FL to FH transition counters (for any of the decoding modes) reaches a threshold transition count, as determined at decision block 728, a shut down phase is started at block 730. If a FL to FH transition counter for at least one of the decoding modes reaches a detection threshold, as determined at block 728, but the OOB transition counter reaches a noise detection threshold, as determined at block 732, the control unit transitions the receiver to the shut down phase at block 730. The wake-up detection process is complete and returns to block 740 to wait until the next polling interval expires, after which the nominal polling period would restart again at block 702. However, if at least one FL to FH transition counter reaches the detection threshold (block 728) and the OOB transition counter is less than a noise threshold (at block 732), an wake-up signal input signal is detected at block 734.

At block 736 the data analyzer 116 performs a comparative analysis of the FL to FH transition counters to select the optimal decoding mode for the ensuing telemetry session. The number of transitions from FL to FH (directly and indirectly) are counted for each of the transition counters corresponding to the nominal, skewed high and skewed low decoding modes. Generally, the decoding mode corresponding to the FL to FH transition counter having the highest count is selected as the decoding mode used for the full telemetry session. In various embodiments, the nominal decoding mode is selected if the nominal FL to FH transition counter is at least n counts higher than either of the FL to FH transition counters for the skewed high and skewed low decoding modes. If the nominal decoding mode does not produce a FL to FH transition count that is at least n counts higher than the other two decoding modes, the highest of the other two decoding modes is selected as the decoding mode in one embodiment.

The data analyzer 116 issues a telemetry interrupt signal at block 738 in response to detecting the wake-up signal, and a carrier select signal is set by data analyzer 116 to indicate a nominal, skewed high or skewed low decoding mode in response to the determination made at block 736. The carrier select signal is used to control which decoding mode is applied to the frequency discriminator counter data by decoder 108. The decoding mode will determine the decoded counter states passed to encoder 110 via signals 140 through 146 for determining a received data signal 149 used by CPU 115 in analyzing received downlink data.

In response to the telemetry interrupt signal, the control unit 112 enables receiver 100 to operate in a full power receiving mode. CPU 115 is fully powered up for higher level data processing and analysis of received data signal 149. Polling state machine 114 can be powered down.

Thus, a medical device receiver and associated method for operation have been presented in the foregoing description with reference to specific embodiments. It is appreciated that various modifications to the referenced embodiments may be made without departing from the scope of the disclosure as set forth in the following claims. It is understood that the aspects or components of the various flow charts and functional block diagrams described herein may be combined in any manner or aspects or components may be eliminated in various embodiments. Furthermore, the order of some blocks in the flow charts may be altered yet the methods still performed successfully for detecting wake-up signals and discriminating valid input signal from noise.

The invention claimed is:

1. A method for operating a medical device receiver adapted to receive radio frequency (RF) signals, the method comprising:
    operating the receiver in a first mode to poll for an RF signal for a first time interval;
    analyzing the RF signal to detect an element of a valid input signal during the first time interval;
    in response to detecting the element of a valid input signal in the first time interval, operating the receiver in a second mode to poll for the RF signal for a second time interval;
    analyzing the RF signal over the second time interval to detect a valid modulation of the RF signal, the second time interval longer than the first time interval; and
    enabling the receiver to establish a communication session with a transmitting device in response to detecting the valid modulation over the second time interval,
    wherein the first mode comprises determining if a carrier signal is present and, in response to detecting the carrier signal being present, remaining in the first mode for the first time interval.

2. The method of claim 1, wherein detecting the element of the valid input signal comprises detecting a frequency component of a predefined frequency modulated signal and detecting the valid modulation comprises detecting the predefined frequency modulated signal.

3. The method of claim 1, wherein the first mode comprises determining if the RF signal is outside a selected signal band and terminating the first time interval prior to an expiration of the first time interval in response to the RF signal being outside the selected signal band.

4. The method of claim 1, further comprising:
    counting oscillations of the RF signal using a plurality of counters;
    determining whether the RF signal is one of a carrier signal state, a first signal state different than the carrier signal state and within a selected signal band, a second signal state different than the carrier signal state and the first signal state and within the selected signal band, and an out of band signal outside the selected signal band in response to the values of the plurality of counters; and
    detecting the element of the valid input signal in the first time interval comprising detecting at least one of the first signal state and the second signal state.

5. The method of claim 1, wherein the second mode comprises counting a first number of transitions of the RF signal between a plurality of states within a selected signal band and a second number of transitions arriving at a carrier signal,
    wherein detecting the valid modulation of the RF signal comprises the first number of transitions being greater than the second number of transitions.

6. The method of claim 5, wherein the first number of transitions comprises transitions between a first state and a second state via a third state different than the first and second states.

7. The method of claim 1, further comprising:
    determining an RF signal state as one of a carrier signal state, a plurality of states different than the carrier signal state and within a selected signal band, and an out of band signal state outside the selected signal band;
    establishing a plurality of RF signal decoding modes for determining the RF signal state;
    counting a number of transitions of the RF signal state during the second time interval for each of the plurality of decoding modes; and in response to the number of transitions counted for each of the plurality of decoding modes, selecting one of the plurality of decoding modes for use in analyzing RF signal input during the communication session.

8. The method of claim 7, wherein selecting the one of the plurality of decoding modes comprises comparing a number of transitions between the plurality of RF signal states counted for each of the decoding modes and selecting the one of the plurality of decoding modes corresponding a greatest number of transitions between the plurality of RF signal states.

9. The method of claim 1, further comprising:
counting oscillations of the RF signal using a plurality of counters;
doubling a frequency of a clock signal received by the plurality of counters to double a resolution of counting the oscillations.

10. A medical device receiver adapted to receive radio frequency (RF) signals, comprising:
a telemetry central processing unit;
a control unit coupled to the processing unit and configured to:
operate the receiver in a first mode to poll for an RF signal for up to a first time interval;
analyze the RF signal to detect an element of a valid input signal during the first time interval;
in response to detecting the element of the valid input signal in the first time interval, operate the receiver in a second mode to poll for the RF signal over a second time interval longer than the first time interval,
analyze the RF signal over the second time interval to detect a valid modulation of the RF signal over the second time interval;
in response to detecting the valid modulation of the RF signal over the second time interval, enabling the receiver to establish a telemetry communication session with a transmitting device; and
a data analyzer enabled by the control unit during the first mode to detect if a carrier signal is present;
in response to detecting the carrier signal being present, the control unit configured to maintain operation of the receiver in the first mode for an entire duration of the first time interval.

11. The receiver of claim 10, wherein detecting the element of the valid input signal comprises detecting a frequency component of a predefined frequency modulated signal and detecting the valid modulation comprises detecting the predefined frequency modulated signal.

12. The receiver of claim 10, wherein
the data analyzer is enabled during the first mode to determine if the RF signal is outside a selected signal band;
the control unit configured to terminate the first time interval prior to an expiration of the first time interval in response to the RF signal being outside the selected signal band.

13. The receiver of claim 10, further comprising:
a plurality of counters enabled during the first time interval to count oscillations of the RF signal;

a data analyzer enabled to determine, in response to the values of the plurality of counters, an RF signal state as one of a carrier signal state, a first signal state different than the carrier signal state and within a selected signal band, a second signal state different than the carrier signal state and the first signal state and within the selected signal band, and an out of band signal state outside the selected signal band;
the element of the valid input signal being detected in the first time interval in response to the data analyzer detecting at least one of the first signal state and the second signal state.

14. The receiver of claim 10, further comprising a data analyzer enabled during the second mode to count a first number of transitions of the RF signal between a plurality of states within a selected signal band and a second number of transitions arriving at a carrier signal,
wherein detecting the valid modulation of the RF signal comprises the first number of transitions being greater than the second number of transitions.

15. The receiver of claim 14, wherein the first number of transitions between a first state and a second state comprises transitions between the first state and the second state via a third state different than the first and second states.

16. The receiver of claim 10, further comprising:
a frequency decoder determining an RF signal state as one of a carrier signal state, a plurality of frequency states within a selected signal band and different than the carrier signal state, and an out of band signal outside the selected signal band;
the control unit configured to establish a plurality of decoding modes for determining the RF signal state;
a data analyzer coupled to the frequency decoder and enabled to count a number of transitions of the RF signal state during the second time interval for each of the plurality of decoding modes; and
in response to the number of transitions counted for each of the plurality of decoding modes, the control unit selecting one of the plurality of decoding modes for use in analyzing RF signal input during the telemetry communication session.

17. The receiver of claim 16, wherein selecting the one of the plurality of decoding modes comprises comparing a number of transitions between the plurality of RF signal states counted for each of the decoding modes and selecting the one of the plurality of decoding modes corresponding a greatest number of transitions between the plurality of RF signal states.

18. The receiver of claim 10, further comprising:
a plurality of counters counting oscillations of the RF signal;
a clock circuit providing a clock signal to the plurality of counters; and
a frequency doubler doubling the frequency of the clock signal to double a resolution of counting the oscillations by the plurality of counters.

* * * * *